United States Patent [19]
Davenport

[11] 3,993,957
[45] Nov. 23, 1976

[54] CLOCK CONVERTER CIRCUIT

[75] Inventor: David William Davenport, Raleigh, N.C.

[73] Assignee: International Business Machines Corporation, Armonk, N.Y.

[22] Filed: Mar. 8, 1976

[21] Appl. No.: 664,794

[52] U.S. Cl. .................................. 328/38; 307/216; 307/208; 307/225 R; 328/16; 328/56
[51] Int. Cl.² ........................................ H03K 5/00
[58] Field of Search ............ 307/220 R, 225 R, 216, 307/208; 328/16, 38, 56; 324/188

[56] References Cited
UNITED STATES PATENTS
| | | | |
|---|---|---|---|
| 3,226,647 | 12/1965 | Shirman | 328/16 |
| 3,386,036 | 5/1968 | Gerrard et al. | 328/56 |

FOREIGN PATENTS OR APPLICATIONS
| | | | |
|---|---|---|---|
| 1,276,703 | 7/1966 | Germany | 307/208 |

OTHER PUBLICATIONS
IBM Tech Disclosure Bull. by Widmer, vol. 6, No. 9, Feb. 1964, pp. 71–72.

Primary Examiner—Stanley D. Miller, Jr.
Attorney, Agent, or Firm—Delbert C. Thomas

[57] ABSTRACT

This invention discloses a structure whereby a fixed frequency machine clocking signal can be multiplied in frequency by any desired integral value. The device uses a tapped delay line having a total time delay slightly less than the time of one-half cycle of the clocking signal and an exclusive-OR tree connected to the taps of the delay line to generate a higher frequency output clock signal. By interposing a known frequency division network to the input of the delay line, the output clock signal can be generated with any desired rational relationship to the driving clocking signal.

4 Claims, 2 Drawing Figures

CLOCK CONVERTER CIRCUIT

BACKGROUND OF THE INVENTION

This invention relates to frequency multiplying devices in general and more particularly to a tapped delay line with an exclusive OR tree connected thereto to generate a harmonic square wave type of output signal from a basic clock signal. Frequency multiplying circuits have been in use for a long time, but have lacked precision in the multiplied output where some pulses might be generated with a different width to resynchronize the output with input transitions as in TV deflection circuits wherein a free running multivibrator is triggered by a synchronizing signal. Another known frequency doubler uses a non-tapped delay line and a single exclusive OR type circuit to generate a double frequency square wave type signal. This frequency doubler cannot be extended to higher frequency multiples of the input clock frequency.

OBJECTS OF THE INVENTION

It is then, an object of this invention to provide a frequency multiplying device for square wave clock signals which will provide an output square wave which is an integral frequency multiple of an input clocking signal.

It is also an object of this invention to provide a clock signal generator which will provide an output signal which is an accurate integer multiple of three or more of an input clock signal.

A further object is to combine such a frequency multiplier for square waves with a frequency divider whereby any rational multiple of an input signal frequency can be generated.

Another object is the provision of a device which can be designed to produce an output signal whose frequency bears a rational number relationship with the frequency of an input signal.

Other objects and advantages will be apparent in the following description with appended drawings of a preferred embodiment of the invention.

SPECIFICATION

Figure 1:
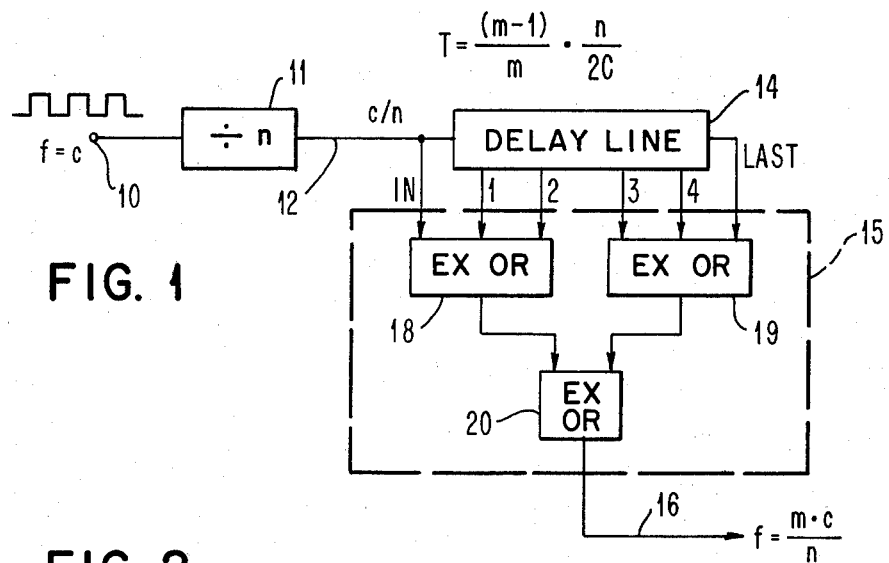
FIG. 1 is a schematic diagram of an embodiment of the invention.

The structure of FIG. 1 can be used to generate an output clock signal at a frequency bearing an integral relationship to a fixed frequency input clock. The device receives a square wave clocking signal at a frequency C from an associated machine, for example, a data processor and will multiply and divide the signal to generate a frequency m/n C.

In FIG. 1, a clocking signal will be received at a terminal 10 and will operate a frequency divider 11 of any of the known types such as a binary or decimal counter or a counter which resets itself whenever it reaches a set count or the like. The counter output line 12 will then carry a square wave of a frequency C/n where n is an integer. This C/n square wave is then applied to a tapped delay line 14 having a time delay T of at least T = $m-1/2m$ . n/C where $m$ is another integer different from $n$. The delay line 14 is tapped to provide at least $(m-1)$ output signals at multiples of a time delay of n/2mC, i.e., the input signal delayed n/2mC, 2n/2mC, 3n/2mC, etc.

These $(m-1)$ output signals together with the input signal to the delay line are entered into a parity tree 15 which will supply a significant signal output on line 16 when an odd number of significant voltage signals are present at the parity tree inputs. The parity tree 15 is a conventional configuration of layers of exclusive OR circuits 18, 19, and 20. All of the inputs to parity tree 15 from the delay line 14 are inputs in any order to exclusive OR's 18 and 19 of a first row and the outputs of the first row are further combined in the exclusive OR's such as 20 of the second row. Other rows of exclusive OR's may be used as needed to generate a single output from all required inputs. A representative exclusive OR circuit may be found in the publication, "Manual of Logic Circuits," by Gerald A. Maley, published by Prentice-Hall, Inc., in 1970 and deposited in the Library of Congress under card number. Exclusive OR circuits may be found at pages 47, 48, 51–56, 161, 162, 163 and 166–169. An exclusive OR parity tree 15, which provides an output signal when an even number of inputs are energized, is also possible.

Figure 2:
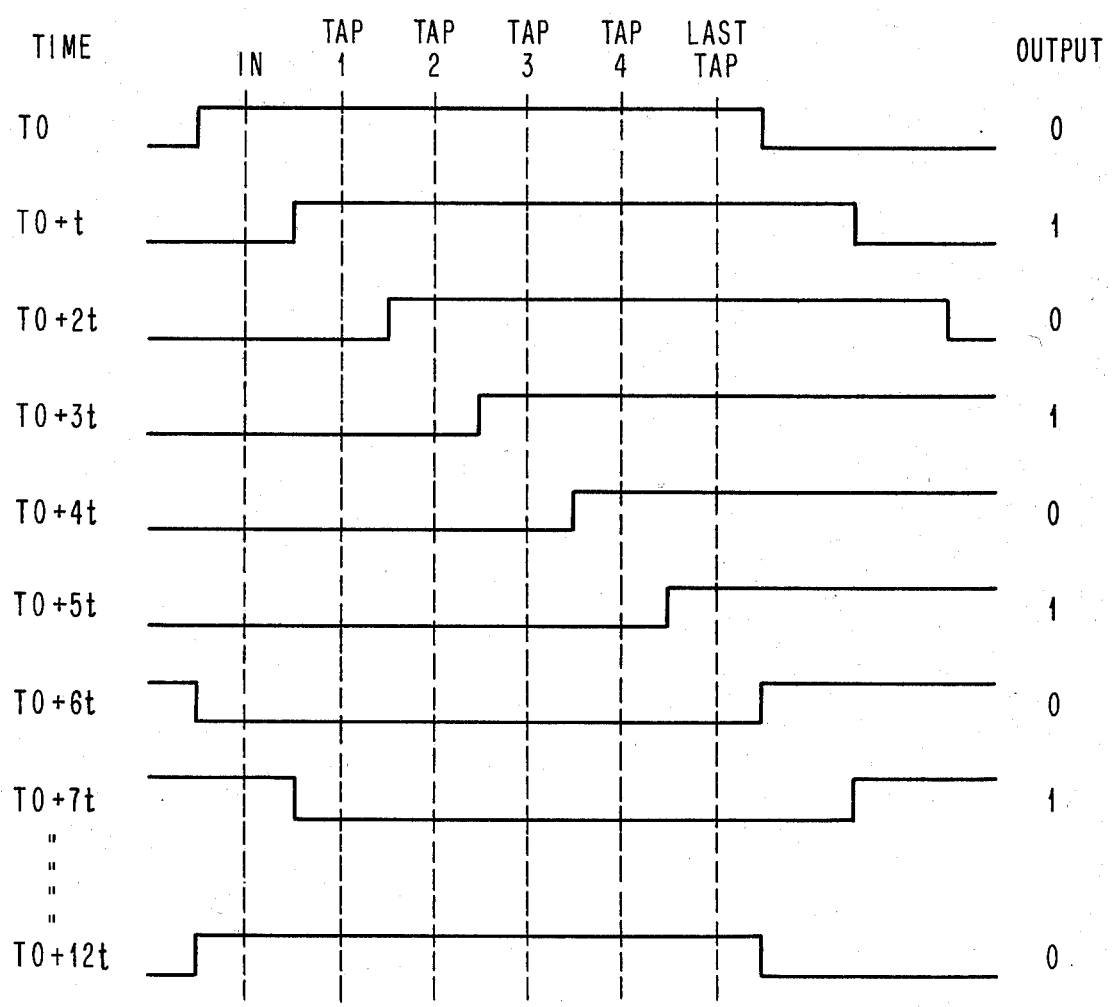
FIG. 2 is a time graph showing the sequence of a clock pulse through the structure of FIG. 1.

FIG. 2 is a representation of the operation of the circuit of FIG. 1 on a time basis. The $m$ selected for the circuit is 6 which requires $(m-1)$ or 5 delay line sections with each section having a delay time $t$ of 1/6 of a half cycle of the input signal from divider 11. The successive lines are taken at integral multiples of this time interval. At time $T_0$, it will be seen that the output of divider 11 has been up long enough to pass completely through delay line 14 and therefore the input and all taps are at an up voltage. The parity tree receives 6 inputs and its output is at a down level. At time $T_0+t$, the output of divider 11 is at a down level so the delay line input is also down and only the five taps supply an up level signal to parity tree 15 which will now have its output at an up level. At time $T_0+2t$ the down level input has passed the first tap and only four up voltage signals are received at the parity tree 15 and its output is again at a down level. It will be seen that this alteration of outputs will continue as the down level signal passes the taps of delay line 14 so the parity tree receives successively 3, 2, and 1 up level signals and at time $T_0+6t$, the down level signal has passed all inputs. Now, the output level of divider 11 changes and at time $T_0+7t$ the up level has passed into the delay line 14 and the parity tree is receiving one high level signal. For each time increment of t, another of the parity tree inputs will be changed to an up level to switch the tree output signal until at time $T_0+12t$, the signal status is back to where it was at $T_0$ and one complete cycle has been outputted from divider 11. It will be seen that over this period, the output on line 16 has passed through six full alterations so that the frequency multiplication factor is 6. Other multiplication factors m may be used by providing that the delay line is to have a time delay of at least $m-1/m$ . n/2C with $m-1$ taps spaced at a time delay of n/2mC apart.

The combination of a frequency multiplier for any integral multiplication factor with a dividing circuit having a desired division factor $n$ will enable generation of an output clock frequency which is any desired rational fractional m/n multiple of the frequency of an input clock signal. Modifications of the above described embodiment for other multiplication factors will be obvious from the above description which is not to be taken as a limitation of the scope of the invention.

What is claimed is:
1. A frequency multiplying device for generating an output signal which is an integral harmonic of a square wave input signal, said device comprising:
   a signal delay line having input and output terminals and at least one tap, the time delay from any terminal or tap to an adjacent terminal or tap being equal to 1/2mC where $m$ is a frequency multiplying factor and C is the frequency of said input signal, said delay line having a total time delay of at least $m-1/2mC$; and
   a parity tree connected to m consecutive ones of said terminals and taps, said parity tree operating to supply a significant output signal when any one of a group of selected combinations of input signals is present at said terminals and taps.

2. A frequency multiplying device as set out in claim 1, including:
   a frequency divider in the input circuit of said delay line, said divider acting to generate a square wave output having a frequency of 1/n times an input clock signal; and
   a connection to conduct the output of said frequency divider to said input of said delay line.

3. A frequency multiplying device to generate a square wave output having a frequency of m times a square wave input signal, said device comprising:
   a delay line having an input terminal to receive said input signal and a plurality of delay sections connected in series and to said input, each delay section having a time delay of 1/2m of the frequency of said input signal; and
   a logic section having m inputs, each input connected to a different one of said input and the connections between delay line sections, and a plurality of logic circuits connected to said inputs and operative to generate a square wave output having a frequency of m times said input signal.

4. A frequency multiplying device as set out in claim 3, and including therewith:
   a frequency dividing circuit in series with said multiplying circuit and operating to provide at its output a square wave type signal having a frequency of 1/n times its incoming signal whereby said multiplying-dividing circuit will generate an output signal having a relationship of m/n times said input signal.

* * * * *